(12) United States Patent
Bhagwan et al.

(10) Patent No.: US 11,080,796 B2
(45) Date of Patent: Aug. 3, 2021

(54) AUTOMATED SUMMARY AND ACTION GENERATION FOR IDENTIFIED EVENTS

(71) Applicant: VERIZON MEDIA INC., New York, NY (US)

(72) Inventors: Varun Bhagwan, San Jose, CA (US); Kaushal Kurapati, Cupertino, CA (US)

(73) Assignee: VERIZON MEDIA INC., New York, NY (US)

( * ) Notice: Subject to any disclaimer, the term of this patent is extended or adjusted under 35 U.S.C. 154(b) by 465 days.

(21) Appl. No.: 14/182,566

(22) Filed: Feb. 18, 2014

(65) Prior Publication Data

US 2015/0234806 A1 Aug. 20, 2015

(51) Int. Cl.
*G06F 40/279* (2020.01)
*G06Q 50/00* (2012.01)
*G06Q 10/10* (2012.01)

(52) U.S. Cl.
CPC ........... *G06Q 50/01* (2013.01); *G06F 40/279* (2020.01); *G06Q 10/1093* (2013.01)

(58) Field of Classification Search
None
See application file for complete search history.

(56) References Cited

U.S. PATENT DOCUMENTS

| | | | | |
|---|---|---|---|---|
| 6,732,103 B1* | 5/2004 | Strick | ........... | G06Q 10/109 |
| 2002/0131565 A1* | 9/2002 | Scheuring | ........... | G06Q 10/109 379/88.19 |
| 2002/0152105 A1* | 10/2002 | Dan | ........... | G06Q 10/109 718/100 |
| 2007/0005406 A1* | 1/2007 | Assadian | ........... | G06Q 10/1093 705/7.18 |
| 2009/0170532 A1* | 7/2009 | Lee | ........... | H04M 1/72457 455/456.3 |
| 2010/0070877 A1* | 3/2010 | Scott | ........... | G06Q 10/109 715/751 |

FOREIGN PATENT DOCUMENTS

EP 1915014 A2 * 4/2008 ............ H04W 36/24

OTHER PUBLICATIONS

McKechnie, Sharon P; Beatty, Joy E. Contemporary calendar management: Exploring the intersections of groupware and personal calendars. Management Revue. 2015. Business and Economics—Abstracting, Bibliographies, Statistics. p. 185-202. (Year: 2015).*
The New Gmail: More Smarts, More Security . . . More Clutter. Dow Jones Institutional News. Apr. 25, 2018. Business and Economics. Google Inc. (Year: 2018).*
Introducing Google Now; URL is http://www.google.com/landing/now/#whatisit; 4 pages.
Google Now, See All Cards; URL is http://www.google.com/landing/now/#cards; 7 pages.
Google Now, Wikipedia; URL is http://en.wikipedia.org/wiki/Google_Now; 4 pages; 2014.

* cited by examiner

*Primary Examiner* — Patricia H Munson
*Assistant Examiner* — Nancy N Prasad
(74) *Attorney, Agent, or Firm* — James J. DeCarlo; Greenberg Traurig, LLP

(57) ABSTRACT

Disclosed herein is system, method and architecture to process information received in electronic messages, including identifying events in the lives of users from the information contained in one or more such electronic messages.

28 Claims, 8 Drawing Sheets

AUTOMATED SUMMARY AND ACTION GENERATION FOR IDENTIFIED EVENTS

FIELD OF THE DISCLOSURE

The present disclosure relates to automating summarization of and generating action(s) in response to information extracted from electronic messages, such information may be used to identify one or more events in the lives of users, which life events may be summarized and/or in connection with which one or more actions may be generated.

BACKGROUND

Electronic messaging, such as and without limitation electronic mail messages, instant messages, short messages, social media posts, etc., has become an important means by which many computing users receive information. Users receive invitations to events, such as work or social meetings or gatherings, deliveries, travel itineraries, concerts, etc., and receive information about events in electronic messages, for example. As the number of messages received by a user increases, it becomes difficult for the user to be able to properly address all of the information contained in the received messages. In addition, information may be spread across multiple electronic messages and different types of electronic messages.

SUMMARY

The present disclosure seeks to address failings in the art and to provide a system, method and architecture to process information received in electronic messages, including identifying events in the lives of users using at least information contained in one or more such electronic messages. In accordance with one or more embodiments, information about an event in the life of a user may be obtained from multiple electronic messages and from different types of messages, e.g. electronic mail messages, instant messages, short messages, blog posts, social media system posts, etc. The information extracted from such electronic messages may be aggregated for a given life event, information about multiple events in the life of a user may be presented to the user in an aggregate form, e.g., a summary report, dashboard, etc., where the information may be obtained from multiple, different types of electronic messages. In accordance with one or more embodiments, one or more actions may be taken on behalf of the user, such as and without limitation accessing one or more external information sources to supplement the information obtained from the electronic messages, one or more calendar entries may be added to the an electronic calendar, documents, e.g., electronic messages, etc., may be composed for the user. In accordance with one or more embodiments, documents may be composed in draft form for the user's review and approval before the document(s) is/are distributed, e.g. transmitted using one or more messaging applications.

In accordance with one or more embodiments, a method is provided, the method comprising periodically performing by at least one computing device: analyzing a plurality of electronic messages to identify a plurality of items for a user and extract information associated with the plurality of items from the plurality of electronic messages; identifying at least one life event associated with at least one user using the plurality of items and the associated information; and generating a report for the at least one user, the report aggregating a plurality of life events identified using the information associated with one or more items of the plurality of items identified from the plurality of electronic messages and summarizing information about each life event of the plurality, the report comprising at least one entry for each life event, the at least one entry summarizing at least a portion of the information associated with at least one item of the plurality of items identified by analyzing the plurality of electronic messages.

In accordance with one or more embodiments a system is provided, which system comprises at least one computing device comprising one or more processors to execute and memory to store instructions to periodically perform: analyzing a plurality of electronic messages to identify a plurality of items for a user and extract information associated with the plurality of items from the plurality of electronic messages; identifying at least one life event associated with at least one user using the plurality of items and the associated information; and generating a report for the at least one user, the report aggregating a plurality of life events identified using the information associated with one or more items of the plurality of items identified from the plurality of electronic messages and summarizing information about each life event of the plurality, the report comprising at least one entry for each life event, the at least one entry summarizing at least a portion of the information associated with at least one item of the plurality of items identified by analyzing the plurality of electronic messages.

In accordance with yet another aspect of the disclosure, a computer readable non-transitory storage medium is provided, the medium for tangibly storing thereon computer readable instructions that when executed cause at least one processor to periodically perform: analyzing a plurality of electronic messages to identify a plurality of items for a user and extract information associated with the plurality of items from the plurality of electronic messages; identifying at least one life event associated with at least one user using the plurality of items and the associated information; and generating a report for the at least one user, the report aggregating a plurality of life events identified using the information associated with one or more items of the plurality of items identified from the plurality of electronic messages and summarizing information about each life event of the plurality, the report comprising at least one entry for each life event, the at least one entry summarizing at least a portion of the information associated with at least one item of the plurality of items identified by analyzing the plurality of electronic messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of components for use in accordance with one or more embodiments of the present disclosure.

FIG. 2 provides an example of a user interface including an alert in accordance with one or more embodiments of the present disclosure.

FIG. 3 provides some examples of entries in a life event summary that may be provided in accordance with one or more embodiments of the present disclosure.

FIG. 4, which comprises FIGS. 4A and 4B, provides an example process flow in accordance with one or more embodiments of the present disclosure.

FIG. 5 provides an example of a dashboard including examples of actions in accordance with one or more embodiments of the present disclosure.

DETAILED DESCRIPTION

Figure 1:
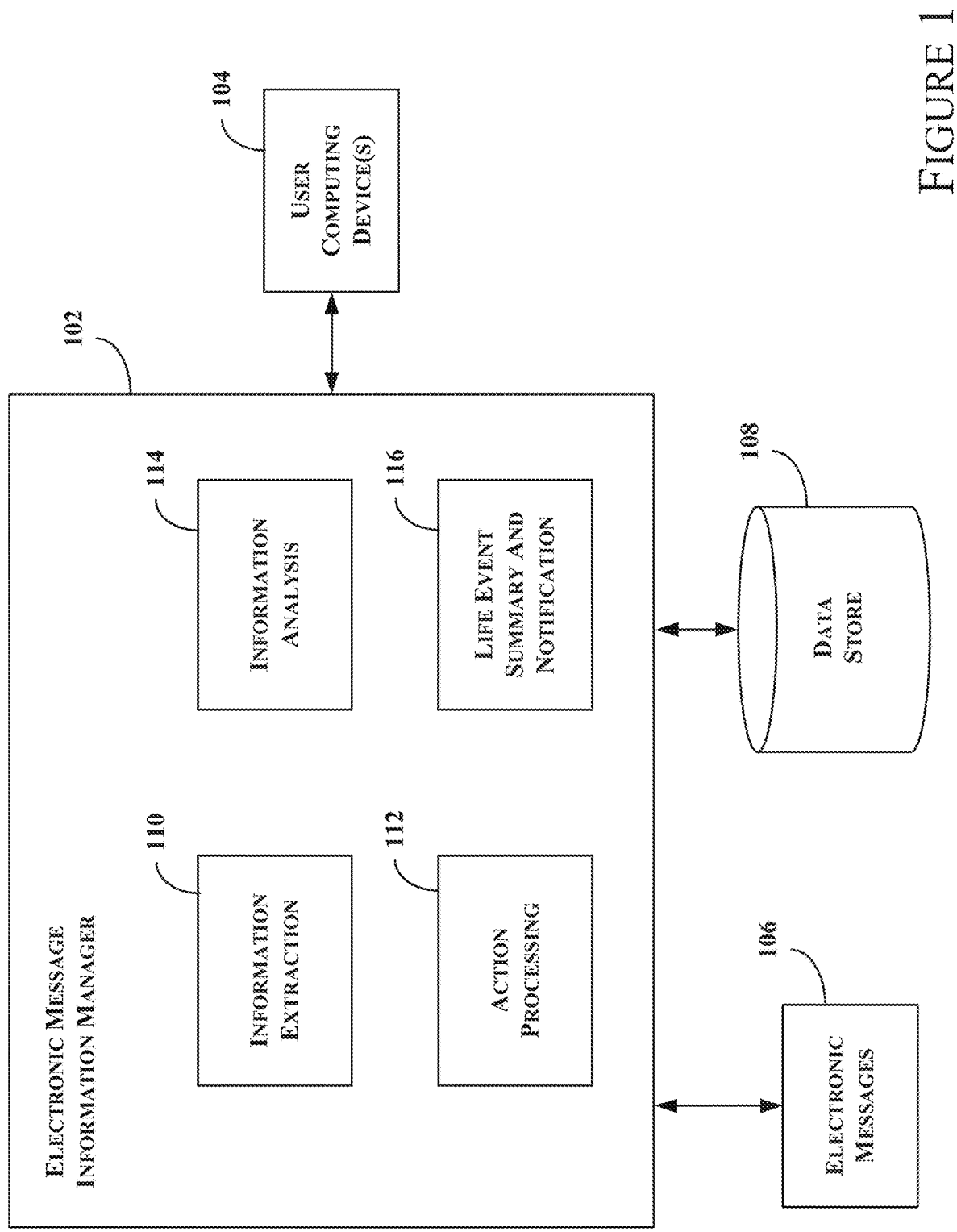

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a life event summarization system, method and architecture.

In accordance with one or more embodiments, events in a user's life may be recognized by analyzing electronic messages, extracting information, including metadata, from the electronic messages. In accordance with one or more such embodiments, an action, or actions, on behalf of the user. By way of some non-limiting examples, "life events" of a user may include future events, e.g. events scheduled to occur in the near future, e.g. in the next week or so. By way of some further non-limiting examples, electronic messages that may be analyzed may include information such as notifications of travel itineraries of the user or another person associated with the user, e.g. friend(s), family member(s), co-worker(s), acquaintance(s), etc.; check-in reminder(s) from an airline; reminder(s) of engagement the user desires, or needs, to attend, package shipments and/or package deliveries; promotions/deals, etc., with expiry dates; stocks vesting in companies, etc.

Information about life events may be included in multiple messages and may be included in different types of messages, which makes it difficult to summary the information about each life event. In accordance with at least one embodiment, information about a user's life event(s) is summarized for the user from information extracted from electronic messages, regardless of the number and or type of electronic message containing the information. In accordance with one or more such embodiments, the information that may be used in summarizing a user's life event may also include information retrieved from a source other than electronic messages, such as and without limitation a service accessible electronically, e.g. online at one or multiple web sites. By way of a non-limiting example, one or more electronic messages may be used to identify a life event of a user and one or more other sources may be used to augment or supplement the information identified from the electronic messages. By way of a further non-limiting example, information obtained from one or more electronic messages may be used to access information from one or more external sources, and vice versa.

A summary of a user's life events facilitates the user's access to information about the user's life events, e.g. the user need not search the electronic message(s) to find the information about an event in the user's life. Embodiments of the present disclosure eliminate the need for searching by the user and provide a summary of the information about the user's life events for review by the user. In addition and in accordance with one or more such embodiments, one or more actions may be taken on behalf of the user.

In at least one embodiment, an automatic mining capability is provided, which peruses a user's electronic messages, such as electronic mail, instant messages, social media web site posts, etc., without a need for any oversight or invention by the user or other entity, to identify upcoming "events", such as and without limitation travel, invitations, package shipments, expiring deals, stock vesting, etc., and extracts relevant information from the messages. The identified event(s) may be provided to the user on a periodic basis. By way of a non-limiting example, a summary report may be provided on a certain evening, such as and without limitation on a Sunday evening, in an electronic mail message, or other electronic message, which provides a summary of event(s). By way of another non-limiting example, a summary may be made accessible to the user via a hyperlink contained in an electronic message, etc. By way of a further non-limiting example, an electronic message may be used to alert the user of changes in information associated with one or more of the user's life events; such a message may include the changes, an updated summary and/or a hyperlink for accessing the changes and/or an updated summary.

In accordance with one or more embodiments, a time window, e.g., next 2-3 weeks, may be used to select the event(s) to include in a summary for a given window of time, or time frame. A window of time may be set by the system, e.g., a default time window, or based on a user's preferred time window. A timing for the summary may be set by the system or based on a user's preferred timing, e.g. the timing may indicate a frequency of the report.

In accordance with one or more embodiments, actions may be taken on a user's behalf. By way of some non-limiting examples, in a case that information extracted from one or more electronic messages identified a parcel delivery, an entry may be added to the user's electronic calendar for the day, and time if specified, of the parcel delivery. The date, and optionally time, may be identified from information included in the electronic message(s) and/or retrieved from the parcel delivery entity's online information, e.g. by searching the parcel delivery entity's data using a parcel delivery tracking number included in the analyzed electronic message(s). In accordance with one or more embodiments, confirmation of an action taken on the user's behalf may be included in a summary provided to the user.

By way of another non-limiting example, an action that may be taken in response to a travel itinerary identified from analyzing one or more electronic messages for a user is to draft an electronic mail message, instant message, etc. to forward the travel/ticket information to one or more entities. In such an example, a summary created for the user may include confirmation of the draft, so that the user may review draft and/or authorize the transmission of the draft.

FIG. 1 provides an example of components for use in accordance with one or more embodiments of the present disclosure.

Electronic message information manager 102 may be used to process electronic messages 106 and to provide a life event summary and/or notifications concerning the user's life event(s) to the user via the user computer device(s) 104. Messages 106 may comprise messages from one or more electronic messaging applications, e.g. electronic mail application(s), instant messaging application(s), social media application(s), blog posting application(s), etc. In accordance with one or more embodiments, manager 102 may comprise an information extraction component, or information extractor, 110, an information analysis component, or information analyzer, 114, an action processing component, or action processor, 112 and a life event summary and notification component, or life event adviser, 116. A data store 108 may comprise information about life events, such as life events identified for the user and/or a notification provided to the user, default settings, user preferences, etc. The default settings and/or user preferences may comprise information indicating a timing for providing a summary to the user, actions that may be taken in connection with a life event, templates of draft documents, such as draft message templates, etc.

Information extractor 110 may extract information from electronic messages 106. Extractor 110 may obtain information from one or more other services, e.g. one or more electronic messaging server products, applications, etc., such as and without limitation Yahoo! Mail. Information that may be extracted includes without limitation information identifying the sender and receiver, user name, sender/recipient messaging address, body of the message, metadata associated with the message, etc.

Information analyzer 114 analyzes the information associated with one or more messages, including information extracted from the message(s), to identify one or more life events for the user and/or one or more actions to be taken in connection with one or more life events. Action processor 112 may perform one or more identified actions that may be taken on behalf of the user, such as and without limitation creating one or more electronic calendar entries, accessing one or more external information sources, pre-compose one or more electronic documents, such as one or more electronic messages, for an identified life event, check delivery status, etc.

Adviser 116 may generate a summary and/or one or more notifications to alert the user of identified life events, actions taken on behalf of the user in connection with the identified life events, etc.

By way of a non-limiting example, electronic messages 106 processed by information extractor 110 may include information about a travel itinerary for travel by the user or someone else other than the user. The electronic messages may be processed by extractor 110 to extract information, which is analyzed by information analyzer 114 to identify such information as the name on the ticket/reservation, origin, destination, airline/carrier, time and date of the flight. Adviser 116 may review the date of the flight to determine that the flight is scheduled for the coming week, or some other time window for a summary, and then life event is added to a summary. Additionally, action processor 112 may composes one or more electronic mail messages, such as and without limitation an electronic mail messages containing the user's flight itinerary information for sending to one or more recipients, an "out of office message" for sending to one or more recipients, etc. Action processor 112 may access one or more external sources to determine the status of the flight, the weather at the departure and/or arrival location, availability and pricing of rental cars, restaurants at the arrival location, etc. The actions taken by action processor 112 may comprise default actions and/or user preferred actions.

By way of another non-limiting example, electronic messages 106 may include information about one or more promotions, which is/are set to expire in the time frame set for summary/notification of life events. Information extractor 110 may extract details about the promotion, information analyzer 114 may determine whether the promotion is a valid promotion from the information extracted by extractor 110 and/or other information, e.g., information obtained online about the promotion, and adviser 116 may alert, the user, via a summary and/or other notification, about the promotion.

In accordance with one or more embodiments, life events identified by adviser 114 from electronic messages 106 may be placed in a queue, e.g., a "to be summarized" queue or bucket, and adviser 116 may select those life events that have an associated date that falls within a certain time frame to be included in a summary. In accordance with one or more embodiments, the summary may comprise a user interface, such as a life event dashboard, which may be sent to the user. By way of a non-limiting example, the summary may be sent to the user via the device(s) 104 in an electronic message, such as an electronic mail message, which might be sent to the user on a weekly basis with a subject line "Summary of Events for Upcoming Week." Of course, it should be apparent that any time frame may be used in accordance with one or more embodiments. The electronic mail message may be sent on a day of the week, e.g. Sunday, selected by the user or determined from default information; however, it should be apparent that, any day of the week may be used.

In a case that the life event is shipment, e.g. a shipment sent to or by the user, of a package via a package shipper, the summary may include a status of a shipment, which action processor 112 may determine by tracking the shipment via the shipper's web site. Action processor 112 may add an entry in the user's calendar for the shipment delivery on the date, and optionally time, determined by tracking the shipment.

By way of a further non-limiting example, information, which includes information extracted from electronic messages 106 by extractor 116, analyzed by analyzer 114 may include information confirming tickets to a show, engagement, or other event as well as information identifying other people with whom the user communicated about the show, engagement event, etc. Action processor 112 may pre-compose a draft electronic message to share the ticket confirmation with the people identified. Adviser 116 may alert the user that there is a draft message, such as a message confirming the tickets for the show, so that the user may review and approve sending the message, or the user may elect to send the message.

In accordance with one or more embodiments, electronic messages 106 may be retrieved from a message "inbox". Alternatively, a copy of each electronic message 106 directed to a user may be placed in a message queue, or message store, for processing by manager 102. In any case, manager 102 uses electronic messages 106 of one or more users to identify life events for one or more users.

In accordance with one or more embodiments, manager 102 may be implemented using one or more server computing devices, one or more user computing devices 104 or some combination thereof.

Figure 2:
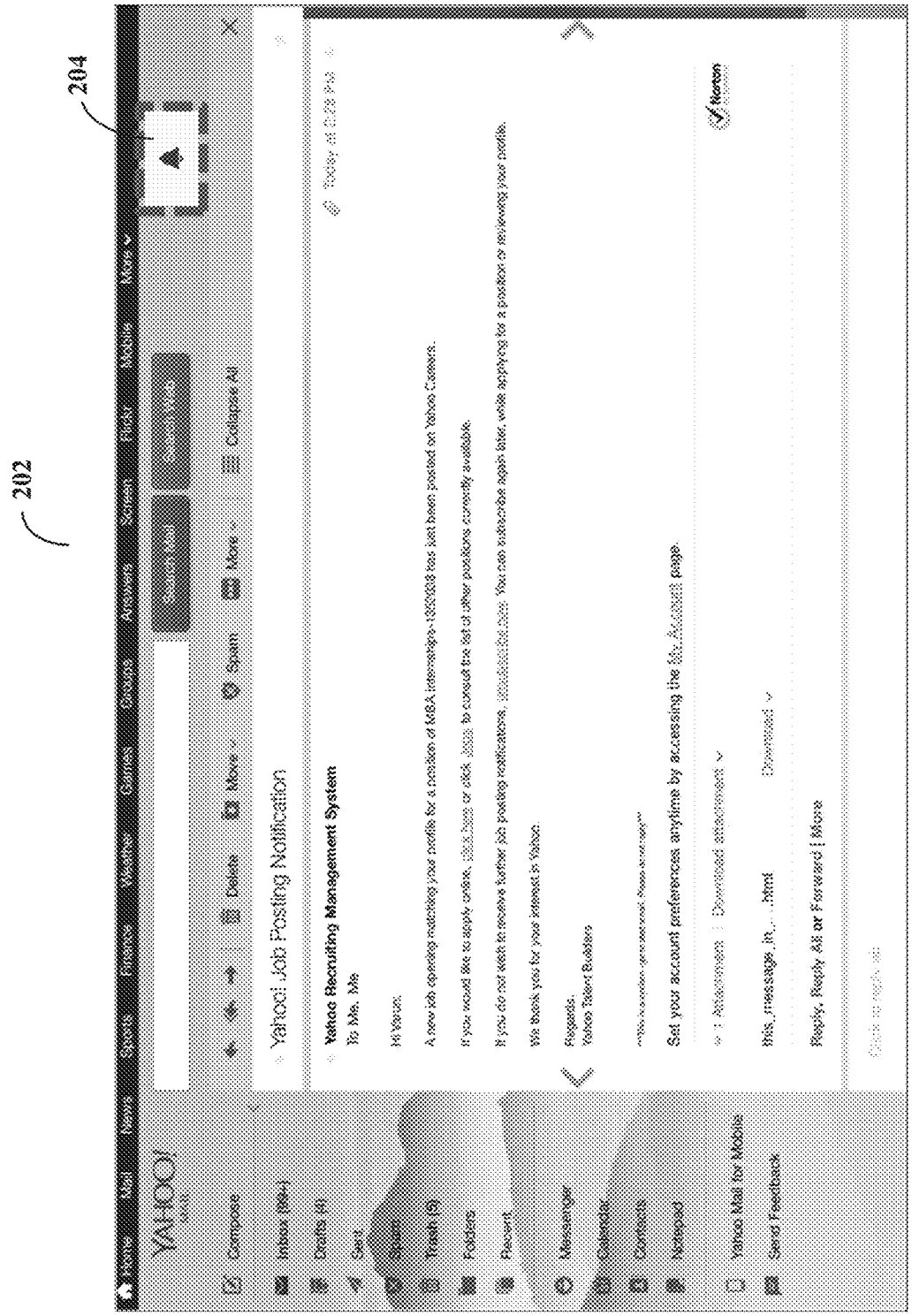

FIG. 2 provides an example of a user interface including an alert in accordance with one or more embodiments of the present disclosure. In the example, the user interface comprises a web page 202, such as is output via Yahoo! Mail®. Of course, it should be apparent that any user face may be used in connection with one or more embodiments of the present disclosure. In the example shown in FIG. 2, web page 202 includes alert 204. Alert 204 may notify the user that there is a new life event, an update to a life event and/or a new, or updated, summary of one or more life events for review by the user. Alert 204 may notify the user that there is a draft electronic message available for review by the user. Alert 204 may comprise a link, e.g. a hyperlink, to the notification, summary, draft message etc. Alert 204 may be provided by adviser 116.

Figure 3:
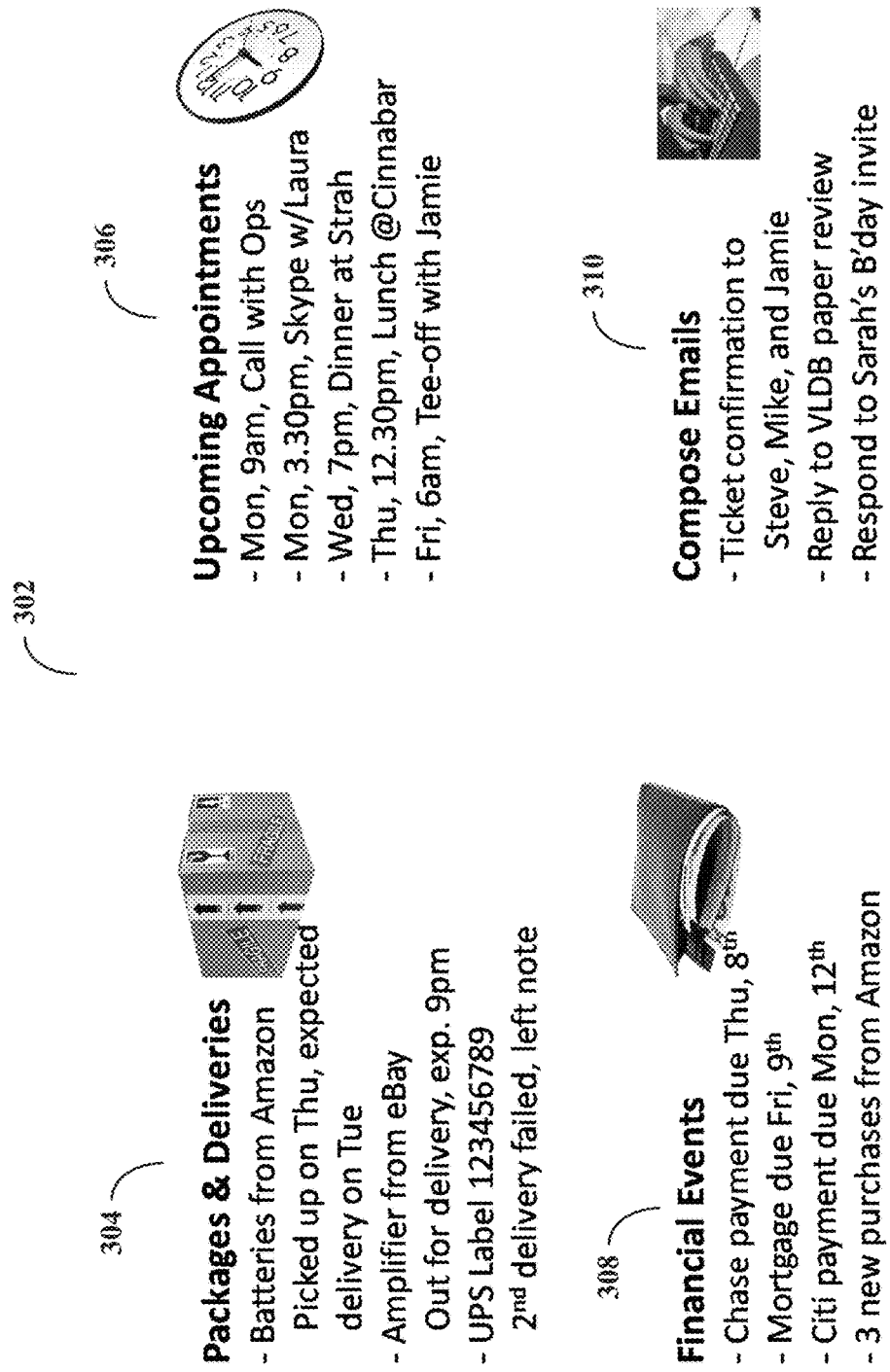

FIG. 3 provides some examples of entries in a life event summary that may be provided in accordance with one or more embodiments of the present disclosure. By way of a non-limiting example, summary 302 may comprise various types of life events. The example shown in FIG. 3 comprises life event types such as shipment(s) 304, appointments 306, financial events 308 and/or email composition 310, each of which has more than one entry. Summary 302 may be provided by adviser 116. In the example of FIG. 3, each type or category has a title followed by one or more entries, each of which may correspond to a life event identified by manager 102. Summary 302 may be referred to as a dashboard, report, etc., which may aggregate life events in a user interface made available to the user, or users.

The "Packages & Deliveries" 302 of summary 302 has entries corresponding to three events in the life of the user, e.g. a shipment of batteries with an expected delivery on Tuesday, a shipment of an amplifier, and a failed delivery despite two attempts. Each of the events include status information. For example, the package of batteries was picked up on Thursday and is expected to be delivered on Tuesday, the amplifier is out for delivery the current day and is expected by 9:00 PM, and there have been two attempts to deliver the final shipment and a note was left. The status information may be obtained from the shipper and/or the package delivery service, e.g. action processor 112 of manager 102 may access the shipper's and/or the delivery service's web site to retrieve information about a shipment/delivery. By way of a non-limiting example, action processor 112 may login into an online merchant's site, e.g. Amazon.com, using a user's login, which may be stored in data store 108, to review information. By way of some non-limiting examples, the information may comprise order processing information, shipping information, and may be accessed using extracted from electronic messages 106 by information extractor 110, such as and without limitation merchant and/or shipper information, order number, shipper's tracking number, etc. Action processor 112 may access a package delivery service's web site, e.g. United Parcel Service's web site, enter tracking information to access shipment/delivery information provided by the delivery service. Action processor 112 may periodically obtain shipment/delivery updates from one or more sites. By way of a further non-limiting example, advisor 116 may add an entry in the user's calendar to contact UPS® about the second failed delivery, e.g., to make other delivery arrangements, and/or add a calendar entry in a user's electronic calendar corresponding to the battery and amplifier shipments. By way of some further non-limiting examples, advisor 116 may compose one or more electronic messages, e.g. one or more text messages, for sending to one or more other individuals, e.g. members of the family, co-workers etc. located at the delivery address, to watch for the package deliveries.

In the example of FIG. 3, summary 302 may further include upcoming appointments 306 each of which may identify a day, date, time, brief description of the appointment, location, participants, etc. Advisor 116 may compose one or more electronic messages as a reminder of the appointment to the user and/or other participants. In accordance with one or more embodiments, composed emails may be provided to the user before being sent.

Summary 302 may also include a summary of electronic message composed for the user by action processor 112. In the example of FIG. 3, the composed messages are electronic mail messages; however, it should be apparent that any type of electronic message may be used in connection with one or more embodiments of the present disclosure.

Another type, or category, of life events identified for a user may be financial events 308 shown in the example summary 302. Financial events 308 may include upcoming payments due, due date, amount etc. In addition, events 308 may include one or more entries to identify purchases made in a new billing cycle, e.g. a credit card's new billing cycle, to alert the user of purchases that will likely appear on a future billing statement, e.g., a statement not yet received by the user.

Figure 4A:
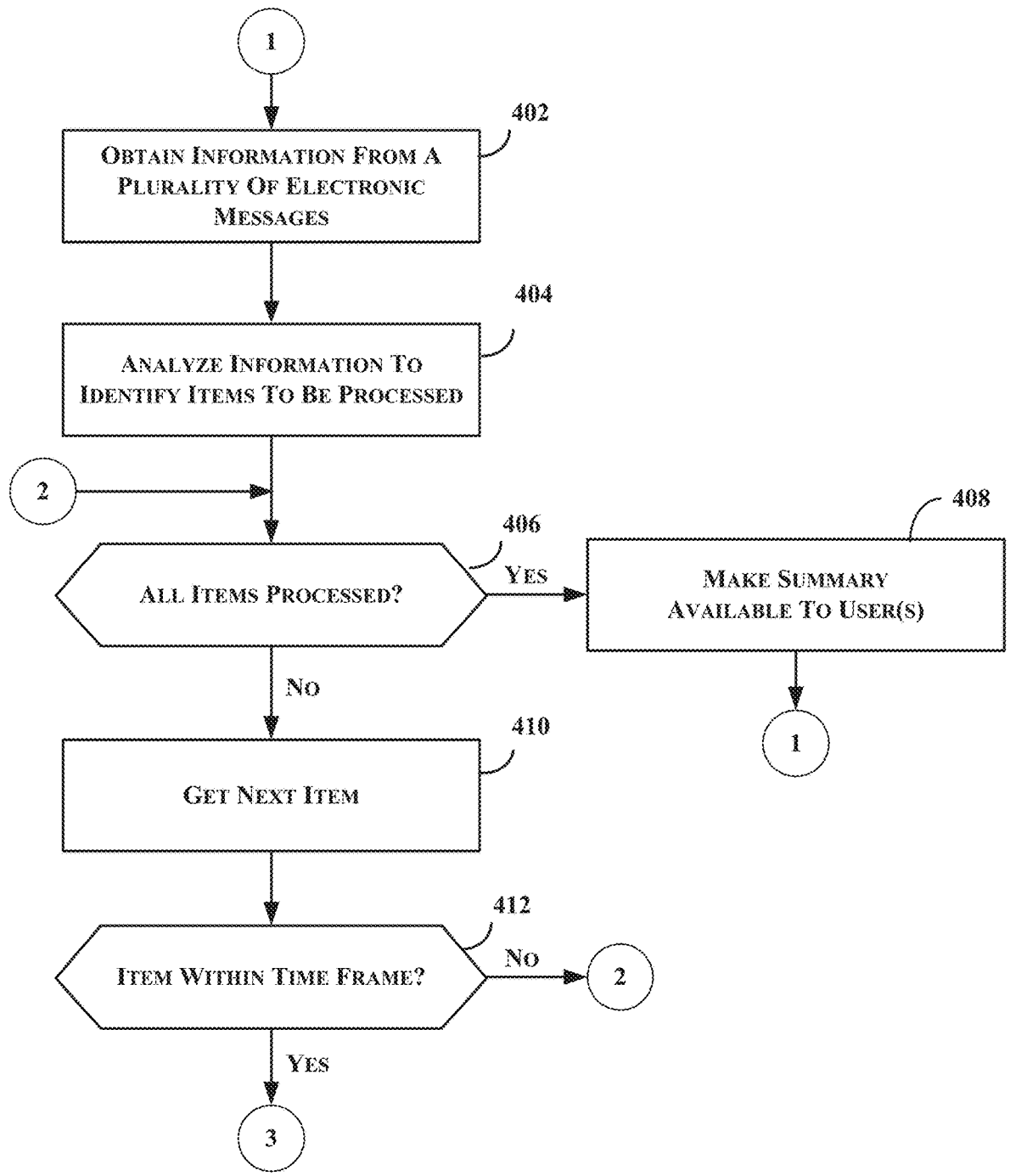
Figure 4B:
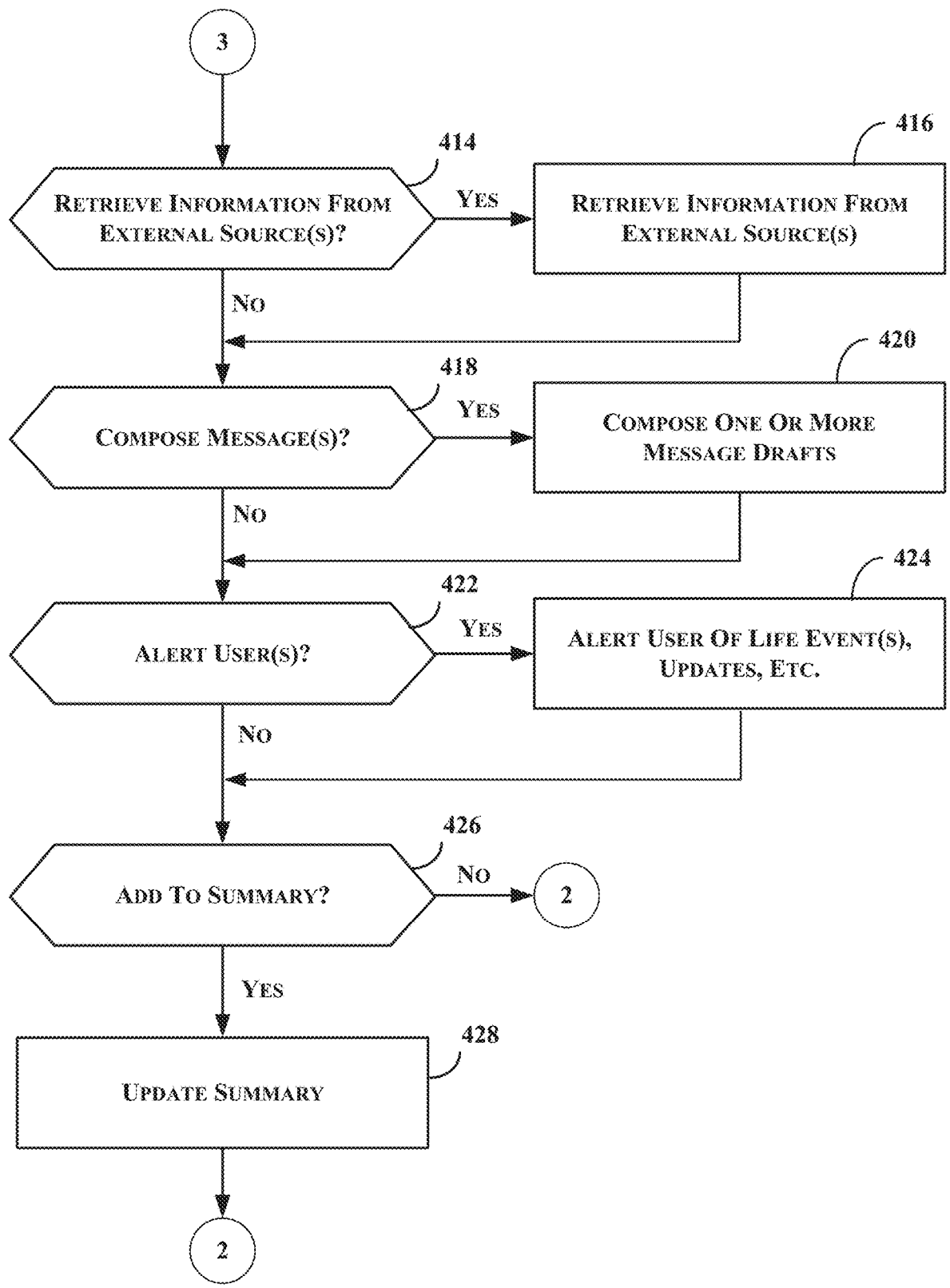

FIG. 4, which comprises FIGS. 4A and 4B, provides an example process flow in accordance with one or more embodiments of the present disclosure. In accordance with one or more embodiments, the example process flow may be executed by manager 102 of FIG. 1.

At step 402, information is obtained from a plurality of electronic messages, e.g. electronic messages 106. The plurality of electronic messages may be analyzed, at step 404, to identify the plurality of items of note or interest for a user, or users, and information associated with the plurality of items may be extracted from the plurality of electronic messages.

At least one life event may be identified using the plurality of items and the associated information. By way of a non-limiting example, at step 406 a determination is made whether all of the items have been processed in identifying life events to be summarized for the user. If so, processing continues, at step 408, to make a summary of life events available to at least one user. If not, processing continues at step 410 to get the next item. At step 412, a determination is made whether or not the current item is within a time frame set for a summary report. Such a determination may be made using information obtained from the plurality of electronic messages and/or information retrieved from one or more external sources, e.g., an online merchant, a delivery service, etc. If not, processing continues at step 406 to process any remaining items. An item that is not within the current time frame may be retained for a future summary report. If the item has an associated time, e.g. date, day of the week, time of the day, month of the year, year, etc., that falls within a desired time frame, processing continues at step 414 of FIG. 4B. A desired time frame may be set by the user or may be a default timeframe.

At step 414, the determination is made whether or not to retrieve information from one or more external sources. Such a determination may be made, for example, to identify any updates to the information extracted from one or more electronic messages in connection with the current item. If it determination is made, at step 414, to retrieve information from an external source, processing continues at step 416 to retrieve information from one or more external sources, and processing continues at step 418. If it determination is made, at step 414, not to retrieve information from an external source, processing continues at step 418.

At step 418, a determination is made whether or not to compose one or more messages in connection with the current item. If so, processing continues at step 420 to compose the one or more messages, which may be composed as draft(s) for review by the user. Processing continues at step 422. If a determination is made, at step 418, not to compose any messages in connection with the current item, processing continues at step 422.

At step 422, a determination is made whether or not to provide an alert the user, e.g. alert 204 of FIG. 2. By way of a non-limiting example, a determination whether or not to provide an alert may be based on an urgency, importance, etc. with respect to a life event identified for the user in analyzing the plurality of electronic messages. By way of a further non-limiting example, a determination whether or not to provide an alert may be based on the timing of a summary report and the timing associated with a particular life event; e.g., the summary report is provided periodically and a timing for the life event's timing is set to occur between two summary reports. In accordance with one or more embodiments, an alert may be used to notify the user that an updated summary report is available, such as an updated report that is provided at a time other than the periodic time typically used to provide a report. It should be apparent that any reasoning may be used to make a determination whether or not provide an alert at step 422. If a determination is made to provide an alert, processing continues, at step 424, to alert the user of a life event, an update to a life event, etc., and processing continues at step 426. If a determination is made, at step 422, not to provide an alert, processing continues at step 426.

At step 426, a determination is made whether or not to add the life event associated with the current item to the summary report. If not, processing continues at step 406 of FIG. 4A to process any remaining items. If so, processing continues at step 428 to update the summary report to include the life event associated with the current item, and processing continues at step 406 to process any remaining items.

In accordance with one or more embodiments, a life event may comprise anything happening in a user's, or users', life(ves). As discussed herein, such things may include shipment or delivery of an item, travel, concert, engagement, etc. In accordance with one or more embodiments, a life event may occur in the future; however, it should be apparent that a life event may have already occurred, i.e. occurred in the past.

In accordance with one or more embodiments, a summary report of life events may identify one or more actions to be taken by the user, e.g. follow-up(s) with boss, potential employer, friend(s) family member(s), co-workers, etc., send calendar meeting invitation, send electronic message, etc. Actions may be prioritized for the user using an ordering specified by the user and/or a default ordering of actions. Such a prioritization may be identified using a numerical designation of an order of prioritization, a color-coding scheme indicating an order of importance, etc.

In accordance with one or more embodiments, one or more recipients of a message composed for the user may be identified using information extracted from one or more electronic messages, a past history of the user, e.g. recipients of past messages, explicit user designation, information from the user's address book or social media site, etc.

Figure 5:
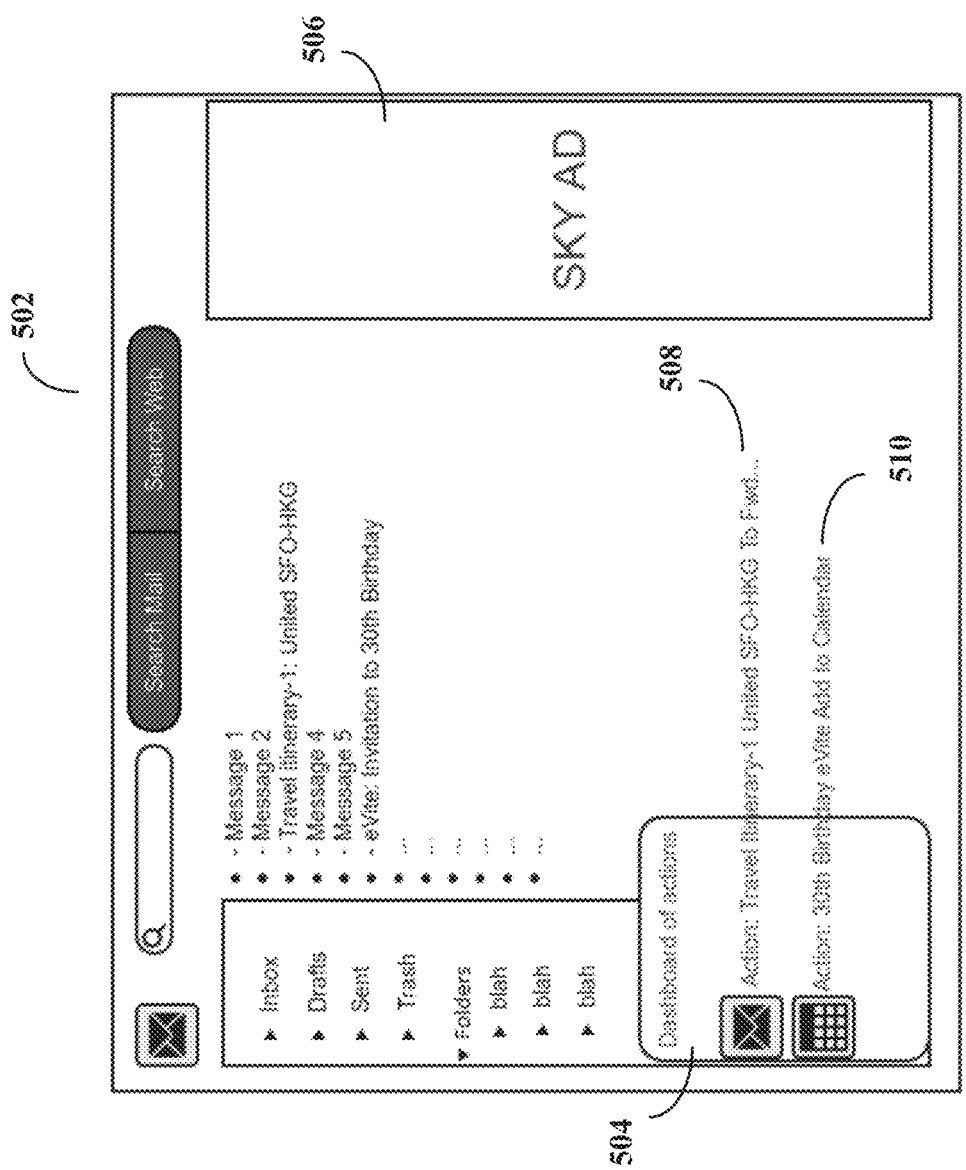

FIG. 5 provides an example of a dashboard including examples of actions in accordance with one or more embodiments of the present disclosure. In the example shown in FIG. 5, a user interface 502 depicts a display screen that might be presented in a web page by an electronic mail service provider in response to a user's login. The user interface display 502 includes options to search mail, search the web, access various email folders, e.g., inbox, drafts, sent and trash, as well, as user-defined folders, etc. The user interface 502 may also display one or more advertisements 506.

User interface 502 includes dashboard 504 which alerts the user that there are actions that may be taken by the user and/or that one or more actions have been taken on the user's behalf. In the example, action 508 of dashboard 504 alerts the user that a draft email message has been composed on the user's behalf and is available for the user's review. The alert 508 may comprise a hyperlink, or other link, that is selectable by the user to view the draft email. In the example, the draft email composed for the user is to forward a travel itinerary to one or more recipients, e.g., the user's spouse, children, co-workers, etc. The draft email might have been composed in response to one or more electronic messages that including information about travel by the user, for example. The user may select action 508 of dashboard 504 to view the email, edit the email, add/remove recipients, send the email, etc. Any changes that the user makes may be used to learn the user's preference(s), and may modify any future action(s) taken on the user's behalf, e.g., the user's changes to the body of the email, recipient change(s) may be used drafting an email on behalf of the user in the future.

Dashboard 504 also includes action 510, which may be an action adding a calendar entry in response to a birthday electronic invitation. As discussed herein, embodiments of the present disclosure may automatically add the calendar entry to a user's calendar. In such a case, the alert 510 may indicate to the user that the calendar entry was added to the use's electronic calendar, and the alert 510 may be selectable by the user to view, edit, remove, etc. the calendar entry. Alternatively and in accordance with one or more embodiments, the alert 510 may alert the user that a draft of a calendar entry is available for the user's review, edit and/or posting to the user's electronic calendar(s). In either case, any changes that the user makes may be used to learn the user's preference(s), and may modify any future action(s) taken on the user's behalf, e.g., the user's changes may be used in drafting an electronic calendar entry and/or automatically adding an electronic calendar entry on behalf of the user in the future.

Figure 6:
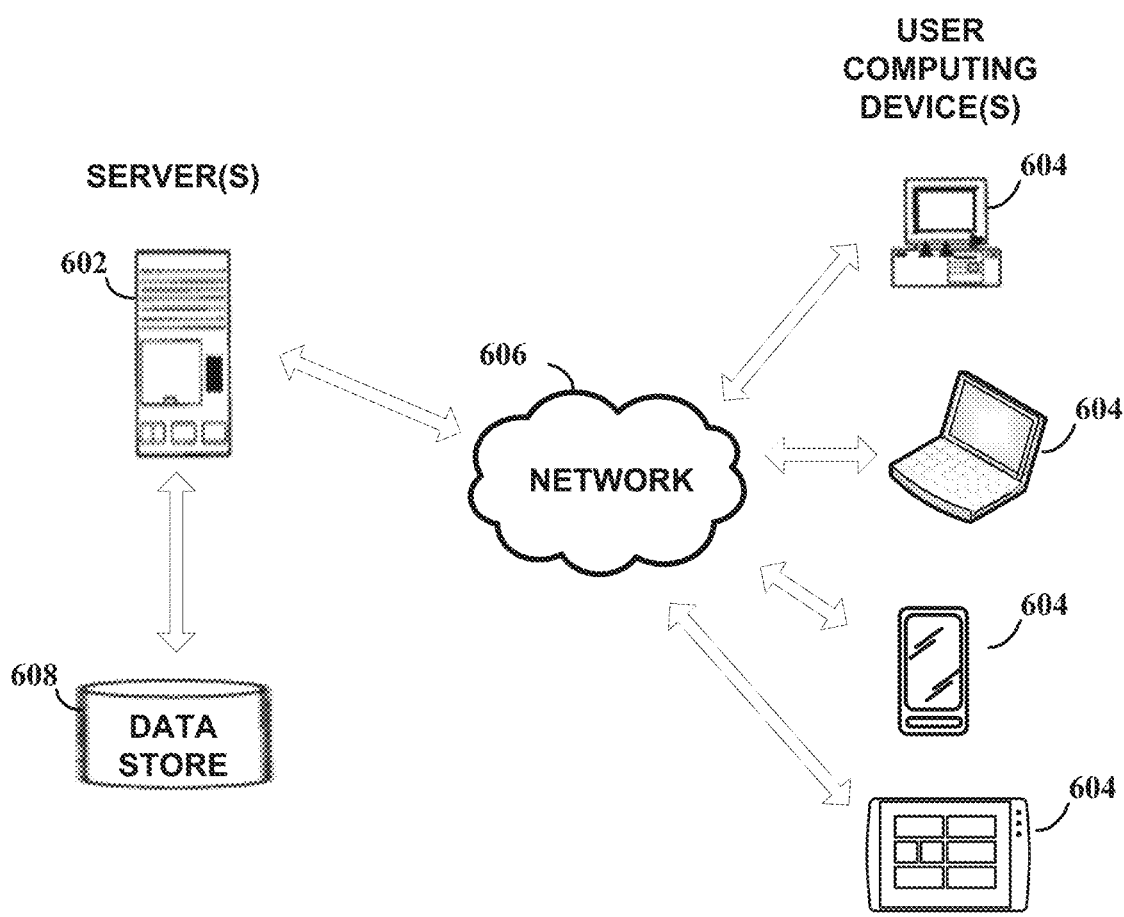
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers 602, user devices 604, which may correspond to user computing device 104, or other computing device, are configured to comprise functionality described herein. For example, a computing device 602 may be configured to execute program code, instructions, etc. to provide functionality in accordance with one or more embodiments of the present disclosure. Computing device 602 may be associated with one or more data stores 608, e.g. data store 608 may correspond to data store 108.

Computing device 602 can serve content to user computing devices 604 using a browser application via a network 606. Data store 608 may be used to store program code to configure a server 602 to execute manager 102, functionality in accordance with one or more embodiments of the present disclosure, etc.

The user computing device 604 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware. Computing device 604 may be configured to perform some or all of the functionality described in connection with one or more embodiments of the present disclosure.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR)

mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 6. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 7:
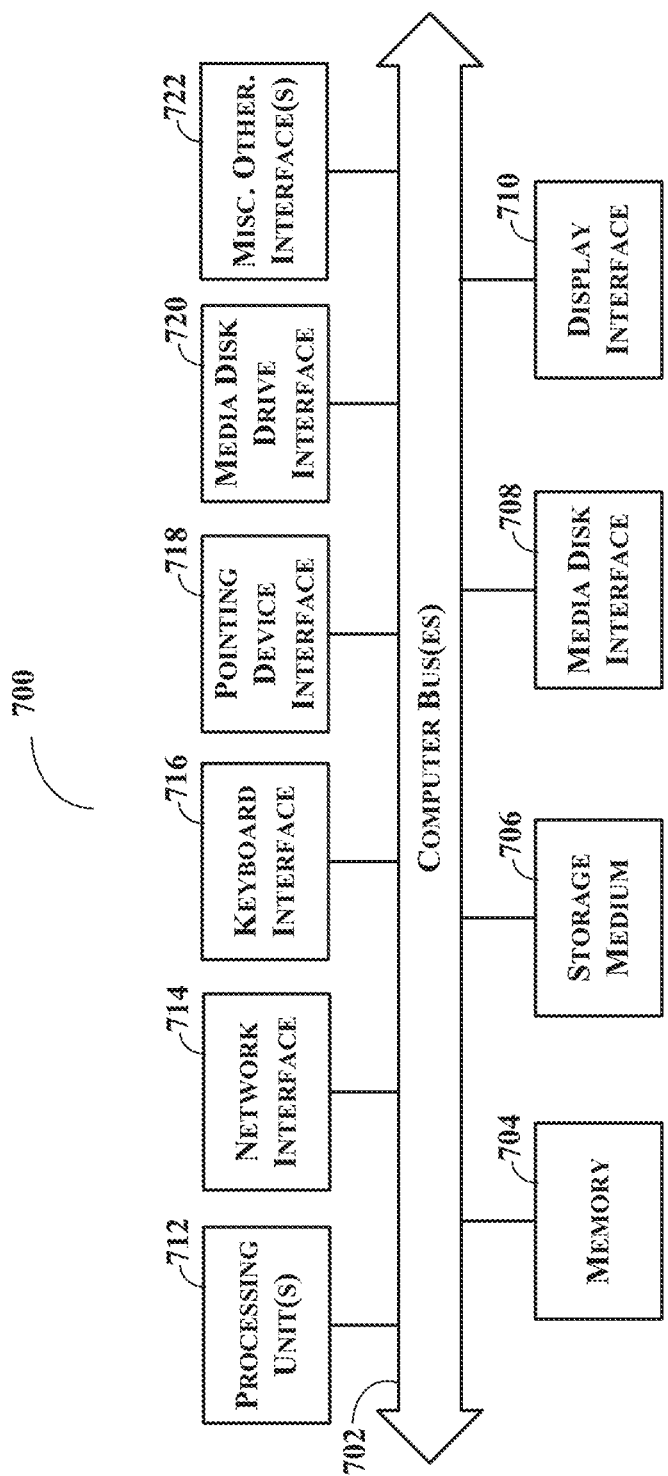
FIG. 7 is a detailed block diagram illustrating an internal architecture of a computing device in accordance with one or more embodiments of the present disclosure.

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, ail of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
analyzing, by an electronic messaging system server, content of a plurality of electronic messages to identify a number of previously-scheduled life events pertaining to a user and indicated in the content, the analyzing comprising, for a previously-scheduled life event of the number of previously-scheduled life events:
extracting information about the previously-scheduled life event from one or more electronic messages of the plurality of electronic messages, the extracted information comprising temporal information indicating a time frame associated with the previously-scheduled life event; and
using the extracted information to identify the previously-scheduled life event pertaining to the user;
selecting, by the electronic messaging system server and for inclusion in a user interface summary, multiple previously-scheduled life events from the number of previously-scheduled life events, the selecting comprising determining that the time frame associated with a previously-scheduled life event of the multiple previously-scheduled life events is within a time frame set for the user interface summary;
causing, by the electronic messaging system server, a draft electronic message to be composed, using user preferences, in connection with at least one previously-scheduled life event;
generating, by the electronic messaging system server, the user interface summary of the multiple previously-scheduled life events selected from the number of previously-scheduled life events, the user interface summary comprising a notification as a user-selectable link alerting the user to the draft electronic message and comprising, for each of the multiple previously-scheduled life events;
an entry summarizing the previously-scheduled life event and generated using selected information extracted from a number of the plurality of electronic messages, the entry comprising a description of the previously-scheduled life event;
making, by the electronic messaging systems, a determination that a timing associated with at least one previously-scheduled life event selected for inclusion in the user interface summary is prior to a predetermined presentation time associated with the user interface summary;
responsive to the determination, the electronic messaging system server, providing a user-selectable alert for display in an electronic messaging user interface at a client computing device of the user, the alert indicating that the user interface summary is available for access by the user prior to the predetermined presentation time associated with the user interface summary;
responsive to receiving input indicating the user's selection of the alert, transmitting, by the electronic messaging system server and via an electronic communications network to the client computing device of the user, the user interface summary of the multiple previously-scheduled life events, the transmitting causing the user interface summary of the multiple previously-scheduled life events, generated using selected information extracted from the number of the plurality of electronic messages, to be displayed on the display at the client computing device;
detecting user interaction with the draft electronic message; and
updating the user preferences in accordance with the detected user interaction.

2. The method of claim 1, further comprising:
modifying, by the electronic messaging system server, at least one electronic calendar for the user so that at least one calendar entry reflects information about at least one of the number of previously-scheduled life events, the at least one calendar entry is associated with at least a date, the calendar entry including information obtained from at least one electronic message of the plurality of electronic messages.

3. The method of claim 2, wherein the date is indicated by the information obtained from at least one electronic message of the plurality of electronic messages.

4. The method of claim 2, wherein the date is indicated by information obtained from an external source.

5. The method of claim 2, further comprising:
automatically updating, by the electronic messaging system server, the at least one electronic calendar entry.

6. The method of claim 5, the automatic calendar update further comprising:
obtaining information from an external source; and
automatically updating the at least one electronic calendar entry using the information obtained from the external source.

7. The method of claim 5, wherein the at least one calendar entry is updated using information associated with at least one item identified in analyzing the plurality of electronic messages.

8. The method of claim 1, further comprising:
accessing, by the electronic messaging system server, at least one external source to retrieve information about at least one of the multiple previously-scheduled life events; and
including, by the electronic messaging system server, the information retrieved from the external source in the user interface summary.

9. The method of claim 8, wherein the information retrieved from the at least one external source is used to update at least a portion of the information in the user interface summary.

10. An electronic messaging system server computing device comprising:
a processor;

a non-transitory computer-readable storage medium for tangibly storing thereon program logic for execution by the processor, the program logic comprising:
analyzing logic executed by the processor for analyzing content of a plurality of electronic messages to identify a number of previously-scheduled life events pertaining to a user and indicated in the content, the analyzing comprising, for a previously-scheduled life event of the number of previously-scheduled life events:
extracting information about the previously-scheduled life event from one or more electronic messages of the plurality of electronic messages, the extracted information comprising temporal information indicating a time frame associated with the previously-scheduled life event; and
using the extracted information to identify the previously-scheduled life event pertaining to the user;
selection logic executed by the processor for selecting, for inclusion in a user interface summary, multiple previously-scheduled life events from the number of previously-scheduled life events, the selecting comprising determining that the time frame associated with a previously-scheduled life event of the multiple previously-scheduled life events is within a preset time frame set for the user interface summary;
causing logic executed by the processor for causing a draft electronic message to be composed, using user preferences, in connection with at least one previously-scheduled life event;
generating logic executed by the processor for generating the user interface summary of the multiple previously-scheduled life events selected from the number of previously-scheduled life events, the user interface summary comprising a notification as a user-selectable link alerting the user to the draft electronic message and comprising, for each previously-scheduled life event of the multiple previously-scheduled life events:
an entry summarizing the previously-scheduled life event and generated using selected information extracted from a number of the plurality of electronic messages, the entry comprising a description of the previously-scheduled life event;
determination logic executed by the processor for making a determination that a timing associated with at least one previously-scheduled life event selected for inclusion in the user interface summary is prior to a predetermined presentation time associated with the user interface summary;
providing logic executed by the processor for providing, in response to the determination, a user-selectable alert for display in an electronic messaging user interface at a client computing device of the user, the alert indicating that the user interface summary is available for access by the user prior to the predetermined presentation time associated with the user interface summary;
transmitting logic executed by the processor for transmitting, responsive to receiving input indicating the user's selection of the alert and via an electronic communications network to the client computing device of the user, the user interface summary of the multiple previously-scheduled life events, the transmitting causing the user interface summary of the multiple previously-scheduled life events, generated using selected information extracted from the number of the plurality of electronic messages, to be displayed on the display at the client computing device;
detecting logic executed by the processor for detecting user interaction with the draft electronic message; and
updating logic executed by the processor for updating the user preferences in accordance with the detected user interaction.

11. The system server of claim 10, further comprising:
modifying logic executed by the processor for modifying at least one electronic calendar for the user so that at least one calendar entry reflects information about at least one of the number of previously-scheduled life events, the at least one calendar entry is associated with at least a date, the calendar entry including information obtained from at least one electronic message of the plurality of electronic messages.

12. The system server of claim 11, wherein the date is indicated by the information obtained from at least one electronic message of the plurality of electronic messages.

13. The system server of claim 11, wherein the date is indicated by information obtained from an external source.

14. The system server of claim 11, further comprising:
updating logic executed by the processor for automatically updating the at least one electronic calendar entry.

15. The system server of claim 14, the automatic calendar update further comprising:
obtaining logic executed by the processor for obtaining information from an external source; and
updating logic executed by the processor for automatically updating the at least one electronic calendar entry using the information obtained from the external source.

16. The system server of claim 14, wherein the at least one calendar entry is updated using information associated with at least one item identified in analyzing the plurality of electronic messages.

17. The system server of claim 10, further comprising:
accessing logic executed by the processor for accessing at least one external source to retrieve information about at least one of the multiple previously-scheduled life events; and
including logic executed by the processor for including the information retrieved from the external source in the user interface summary.

18. The system server of claim 10, wherein the information retrieved from the external source is used to update at least a portion of the information in the user interface summary.

19. A computer readable non-transitory storage medium for tangibly storing thereon computer readable instructions that when executed by a processor associated with an electronic messaging system server, performs a method comprising:
analyzing content of a plurality of electronic messages to identify a plurality of items indicative of a number of previously-scheduled life events pertaining to a user and indicated in the content, the analyzing comprising, for a previously-scheduled life event of the number of previously-scheduled life events:
extracting information about the previously-scheduled life event from one or more electronic messages of the plurality of electronic messages, the extracted information comprising temporal information indicating a time frame associated with the previously-scheduled life event; and;

using the extracted information to identify the previously-scheduled life event pertaining to the user;

selecting, for inclusion in a user interface summary, multiple previously-scheduled life events from the number of previously-scheduled life events, the selecting comprising determining that the time frame associated with a previously-scheduled life event of the multiple previously-scheduled life events is within a time frame set for the user interface summary;

causing a draft electronic message to be composed, using user preferences, in connection with at least one previously-scheduled life event generating the user interface summary of the multiple previously-scheduled life events selected from the number of previously-scheduled life events the number of previously-scheduled life events, the user interface summary comprising a notification as a user-selectable link alerting the user to the draft electronic message and comprising, for each of the multiple previously-scheduled life events;

an entry summarizing the previously-scheduled life event and generated using selected information extracted from a number of the plurality of electronic messages, the entry comprising a description of the previously-scheduled life event;

making a determination that a timing associated with at least one previously-scheduled life event selected for inclusion in the user interface summary is prior to a predetermined presentation time associated with the user interface summary;

responsive to the determination, providing a user-selectable alert for display in an electronic messaging user interface at a client computing device of the user, the alert indicating that the user interface summary is available for access by the user prior to the predetermined presentation time associated with the user interface summary;

responsive to receiving input indicating the user's selection of the alert, transmitting, via an electronic communications network to the client computing device of the user, the user interface summary of the multiple previously-scheduled life events, the transmitting causing the user interface summary of the multiple previously-scheduled life events, generated using selected information extracted from the number of the plurality of electronic messages, to be displayed on the display at the client computing device; and detecting user interaction with the draft electronic message; and updating the user preferences in accordance with the detected user interaction.

20. The computer readable non-transitory storage medium of claim 19, further comprising:

modifying at least one electronic calendar for the user so that at least one calendar entry reflects information about at least one of the previously-scheduled life events, the at least one calendar entry is associated with at least a date, the calendar entry including information obtained from at least one electronic message of the plurality of electronic messages.

21. The computer readable non-transitory storage medium of claim 20, wherein the date is indicated by the information obtained from at least one electronic message of the plurality of electronic messages.

22. The computer readable non-transitory storage medium of claim 20, wherein the date is indicated by information obtained from an external source.

23. The computer readable non-transitory storage medium of claim 20, further comprising:

automatically updating the at least one electronic calendar entry.

24. The computer readable non-transitory storage medium of claim 23, the automatic calendar update further comprising:

obtaining information from an external source; and
automatically updating the at least one electronic calendar entry using the information obtained from the external source.

25. The computer readable non-transitory storage medium of claim 23, wherein the at least one calendar entry is updated using information associated with at least one item identified in analyzing the plurality of electronic messages.

26. The computer readable non-transitory storage medium of claim 19, further comprising:

accessing at least one external source to retrieve information about at least one of the multiple of previously-scheduled life events; and
including the information retrieved from the external source summary in the user interface summary.

27. The computer readable non-transitory storage medium of claim 19, wherein the information retrieved from the external source is used to update at least a portion of the information in the user interface summary.

28. The method of claim 1, further comprising:

automatically performing, by the electronic messaging system server, an action in connection with one of the multiple previously-scheduled life events summarized in the user interface summary, the automatically-performed action being automatically performed based on the user preferences and using the analysis of the plurality of electronic messages, the user interface summary further comprising an action alert as notification to the user of the action automatically-performed and another user-selectable link that is selectable by the user to request additional information about the automatically-performed action;

receiving, by the electronic messaging system serve and from the client computing device via the electronic communications network, input indicative of the user's selection of the other user-selectable link; and transmitting, by the electronic messaging system serve and via the electronic communications network to the client computing device in response to receiving the input indicative of the user's selection of the link, the additional information about the automatically-performed action.

* * * * *